US011386367B1

(12) United States Patent
Tabrizi et al.

(10) Patent No.: US 11,386,367 B1
(45) Date of Patent: Jul. 12, 2022

(54) SYSTEMS AND METHODS FOR DETERMINING EVENT SCHEDULES

(71) Applicant: Recentive Analytics, Inc., Boston, MA (US)

(72) Inventors: Andysheh Tabrizi, Boston, MA (US); Evan Charles Smith, Lexington, MA (US)

(73) Assignee: Recentive Analytics, Inc., Boston, MA (US)

( * ) Notice: Subject to any disclaimer, the term of this patent is extended or adjusted under 35 U.S.C. 154(b) by 0 days.

(21) Appl. No.: 17/332,144

(22) Filed: May 27, 2021

(51) Int. Cl.
  *G06Q 10/06* (2012.01)
  *G06N 20/00* (2019.01)
(52) U.S. Cl.
  CPC ..... *G06Q 10/063116* (2013.01); *G06N 20/00* (2019.01)
(58) Field of Classification Search
  CPC ....... G06Q 10/06311; G06Q 10/06312; G06Q 10/0631; G06Q 10/067; G06Q 10/06315; G06Q 10/10
  USPC ...................................................... 705/7.16
  See application file for complete search history.

(56) References Cited

U.S. PATENT DOCUMENTS

| | | | |
|---|---|---|---|
| 6,925,458 B2 * | 8/2005 | Scaturro ................ | G06Q 30/02 707/999.005 |
| 7,343,312 B2 | 3/2008 | Capek et al. | |
| 8,234,150 B1 * | 7/2012 | Pickton .............. | G06Q 30/0202 705/7.31 |
| 8,433,998 B2 | 4/2013 | Coffman et al. | |
| 8,655,692 B2 * | 2/2014 | Junkin ................... | G06Q 30/08 705/37 |
| 10,614,426 B2 | 4/2020 | Bellary et al. | |
| 2003/0004773 A1 | 1/2003 | Clark et al. | |
| 2009/0292550 A1 | 11/2009 | Ly | |
| 2012/0290339 A1 * | 11/2012 | Sussman .............. | G06Q 10/025 705/5 |
| 2012/0330970 A1 * | 12/2012 | Bieren .................. | G06F 16/951 707/748 |
| 2013/0046580 A1 * | 2/2013 | Harker ................... | G06Q 10/00 705/7.31 |
| 2013/0173317 A1 * | 7/2013 | Higgy .................... | G06Q 10/02 705/5 |

(Continued)

FOREIGN PATENT DOCUMENTS

| | | |
|---|---|---|
| EP | 2743869 A1 | 6/2014 |
| WO | WO-2016108108 A1 | 7/2016 |

OTHER PUBLICATIONS

Chun, Andy Hon Wai, "Using AI for Olympic Equestrian Event Preparation," Association for the Advancement of Artificial Intelligence (www.aaai.org). pp. 1616-1623, 2008. (https://www.aaai.org/Papers/IAAI/2008/IAAI08-001.pdf) (Year: 2008).*

*Primary Examiner* — Charles Guiliano
*Assistant Examiner* — Letoria G Knight
(74) *Attorney, Agent, or Firm* — Goodwin Procter LLP

(57) ABSTRACT

This application relates to systems and methods for generating desired or optimized event schedules. An example computer-implemented method of dynamically generating an event schedule includes: receiving one or more parameters for a series of live events to be held in a plurality of geographic regions; generating a schedule for the series of live events based on the one or more parameters; and automatically updating the schedule based on a change to the one or more parameters.

20 Claims, 7 Drawing Sheets

(56) References Cited

U.S. PATENT DOCUMENTS

| | | | |
|---|---|---|---|
| 2015/0178691 A1* | 6/2015 | Lineberger | G06Q 30/0251 |
| | | | 705/7.19 |
| 2016/0110669 A1* | 4/2016 | Iyer | G06Q 10/06315 |
| | | | 705/7.25 |
| 2017/0236097 A1 | 8/2017 | Smith | |
| 2018/0213273 A1* | 7/2018 | Carter | H04N 21/25825 |
| 2019/0034837 A1* | 1/2019 | Lou | G06N 20/00 |
| 2019/0164135 A1* | 5/2019 | Bellary | G06F 40/30 |
| 2019/0180248 A1* | 6/2019 | Byun | G06Q 10/1095 |
| 2019/0180297 A1* | 6/2019 | Bhatia | G06Q 30/0205 |

\* cited by examiner

| Venue | 9/1 | 9/2 | 9/3 | 9/4 | 9/5 | 9/6 | 9/7 | 9/8 | 9/9 |
|---|---|---|---|---|---|---|---|---|---|
| Venue 1 | P1 | | | | | | | | |
| Venue 2 | | | | | | | | | |
| Venue 3 | | | P1 | | | | | | |
| Venue 4 | | P1 | | | | | | | |
| Venue 5 | | | | | P1 | | | | |
| Venue 6 | | | | | | P1 | | | |
| Venue 7 | | | | | | | | P1 | |
| Venue 8 | | | | | | | | | P1 |
| Projection | 221 | 141 | 432 | | 251 | 676 | | 549 | 246 |

SYSTEMS AND METHODS FOR DETERMINING EVENT SCHEDULES

TECHNICAL FIELD OF THE INVENTION

In general, the subject matter of this disclosure relates to determining event schedules and, more specifically, to optimizing an event schedule for a series of live events or a set of live events to be held in a plurality of geographic regions.

BACKGROUND

Celebrities, musicians, politicians, venue owners, venue managers, and other individuals and entities frequently schedule live events that occur in a plurality of different geographic locations over the course of anywhere from a couple of days to many years. Common examples of such events include concert tours, comedy tours, speaking tours, and campaign rallies. For example, a music group may need to determine a schedule (e.g., including dates and locations) for an upcoming concert tour that covers multiple cities, states, or countries over several months. Additionally, an owner or manager of one or more venues may need to determine a schedule for multiple performers who are available to perform at the one or more venues. Scheduling such live events can be difficult due to a wide variety of factors that may need to be considered (e.g., competing events, expenses, ticket prices, weather, performer availability, venue availability, etc.). Failure to properly consider such factors can lead to sub-optimal schedules that generate little interest among consumers and/or result in low attendance or ticket sales.

There is a need for improved systems and methods for scheduling live events involving one or more performers at a plurality of venues in different geographic locations.

SUMMARY OF THE INVENTION

In various examples, the subject matter of this disclosure relates to improved techniques for scheduling live events for one or more performers in a plurality of geographic locations. In some examples, computer-implemented systems and methods can determine an optimized schedule for a proposed series of live events involving a performer in a plurality of geographic locations (e.g., a concert tour). The systems and methods can receive a variety of input parameters related to the proposed series of live events (e.g., performer availability, venue availability, projected ticket prices, etc.) and can generate a schedule (e.g., using machine learning) that optimizes one or more target features (e.g., total attendance or attendance by a particular demographic segment) for one or more of the live events. Additionally or alternatively, the computer-implemented systems and methods can determine an optimized schedule for proposed live events involving multiple performers in a plurality of geographic locations. The systems and methods can receive a variety of input parameters related to the proposed live events (e.g., performer availability, venue availability, projected ticket prices, etc.) and can generate a schedule (e.g., using machine learning) that optimizes one or more target features (e.g., total attendance) for one or more of the live events. In various examples, a generated schedule can be updated when one or more of the input parameters change. Such updates can be based on real-time data (e.g., real-time input parameters) and, in some instances, the schedule can be dynamically updated in response to changes in this data.

In general, in one aspect, the subject matter described in this specification relates to a computer-implemented method of dynamically generating an event schedule. The method includes: receiving one or more parameters for a series of live events to be held in a plurality of geographic regions; generating a schedule for the series of live events based on the one or more parameters; and automatically updating the schedule based on a change to the one or more parameters.

In certain examples, the one or more parameters can include a tentative schedule for the series of live events. The series of live events can include a tour for a band, a music group, an author, a performer, a comedian, a politician, an activist, and/or a speaker. Generating the schedule can include maximizing a revenue and/or a total attendance for the series of live events and/or a single event from the series of live events. Generating the schedule can include maximizing a revenue and/or a total attendance at the series of live events for a demographic segment. Generating the schedule can include providing the one or more parameters to a machine learning model. Generating the schedule can include choosing a venue, a date, and/or a time for each live event in the series of live events. The step of automatically updating the schedule can include using a machine learning model to update the schedule based on the change to the one or more parameters. The geographic regions can be or include a country, a state, and/or a city.

In another aspect, the subject matter described in this specification relates to a system. The system includes one or more computer systems programmed to perform operations including: receiving one or more parameters for a series of live events to be held in a plurality of geographic regions; generating a schedule for the series of live events based on the one or more parameters; and automatically updating the schedule based on a change to the one or more parameters.

In another aspect, the subject matter described in this specification relates to a computer-implemented method of dynamically generating an event schedule. The method includes: receiving one or more parameters for a plurality of live events including performances by a plurality of performers, the one or more parameters including a list of the performers and a list of available venues in a plurality of geographic regions; generating a schedule for the live events based on the one or more parameters; and automatically updating the schedule based on a change to the one or more parameters.

In certain examples, generating the schedule includes maximizing a total attendance for the plurality of live events and/or a single event from the plurality of live events. Generating the schedule can include maximizing a total attendance at the plurality of live events for a demographic segment. The one or more parameters can include at least one date for the plurality of live events. The plurality of performers can include a band, a music group, an author, a comedian, a politician, an activist, and/or a speaker. Generating the schedule can include providing the one or more parameters to a machine learning model. Generating the schedule can include assigning (i) a first performer from the list of performers to a first venue from the list of available venues and (ii) a second performer from the list of performers to a second venue from the list of available venues. The step of automatically updating the schedule can include using a machine learning model to update the schedule based on the change to the one or more parameters. The geographic regions can be or include a country, a state, and/or a city.

In another aspect, the subject matter described in this specification relates to a system. The system includes one or more computer systems programmed to perform operations including: receiving one or more parameters for a plurality of live events including performances by a plurality of performers, the one or more parameters including a list of the performers and a list of available venues in a plurality of geographic regions; generating a schedule for the live events based on the one or more parameters; and automatically updating the schedule based on a change to the one or more parameters.

Elements of embodiments described with respect to a given aspect of the invention can be used in various embodiments of another aspect of the invention. For example, it is contemplated that features of dependent claims depending from one independent claim can be used in apparatus, systems, and/or methods of any of the other independent claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 7 is a schematic diagram of a graphical user interface presenting a schedule for a series of live events involving a single performer and multiple venues, in accordance with certain examples.

DETAILED DESCRIPTION

In certain examples, a "performer" can be or include an individual or group of individuals who entertain, perform for, and/or speak to an audience, either in person or through a remote connection (e.g., video or audio transmission). The performer can be or include, for example, a musician, a band, a music group, a singer, an artist, a comedian, a theater troupe, an actor, an author, a politician, a speaker, an activist, an acrobat, an athlete, or other individual or group of individuals who may perform for an audience.

In certain examples, a "venue" can be or include a stadium, an amphitheater, a theater, a club, a bar, a park, a cruise ship, a convention center, an exposition center, a town square, or any other building, structure, or location, either public or private, where a performer can perform for an audience.

In certain examples, a "live event" can be or include a live performance by a performer for an audience. The live event can be or include, for example, a concert, a musical performance, a speech, a comedy performance, or any other type of event performed for an audience that witnesses the live event in person or through a remote connection (e.g., video or audio transmission).

In certain examples, a "series" of live events can be or include multiple live events that occur in different geographical locations over a period of time, such as a day, a week, a month, or a year. For example, a series of live events can be a tour for a music group (or other performer) that performs in different venues, in different geographic regions (e.g., cities, states, or countries), over a period of weeks or months.

Figure 1:
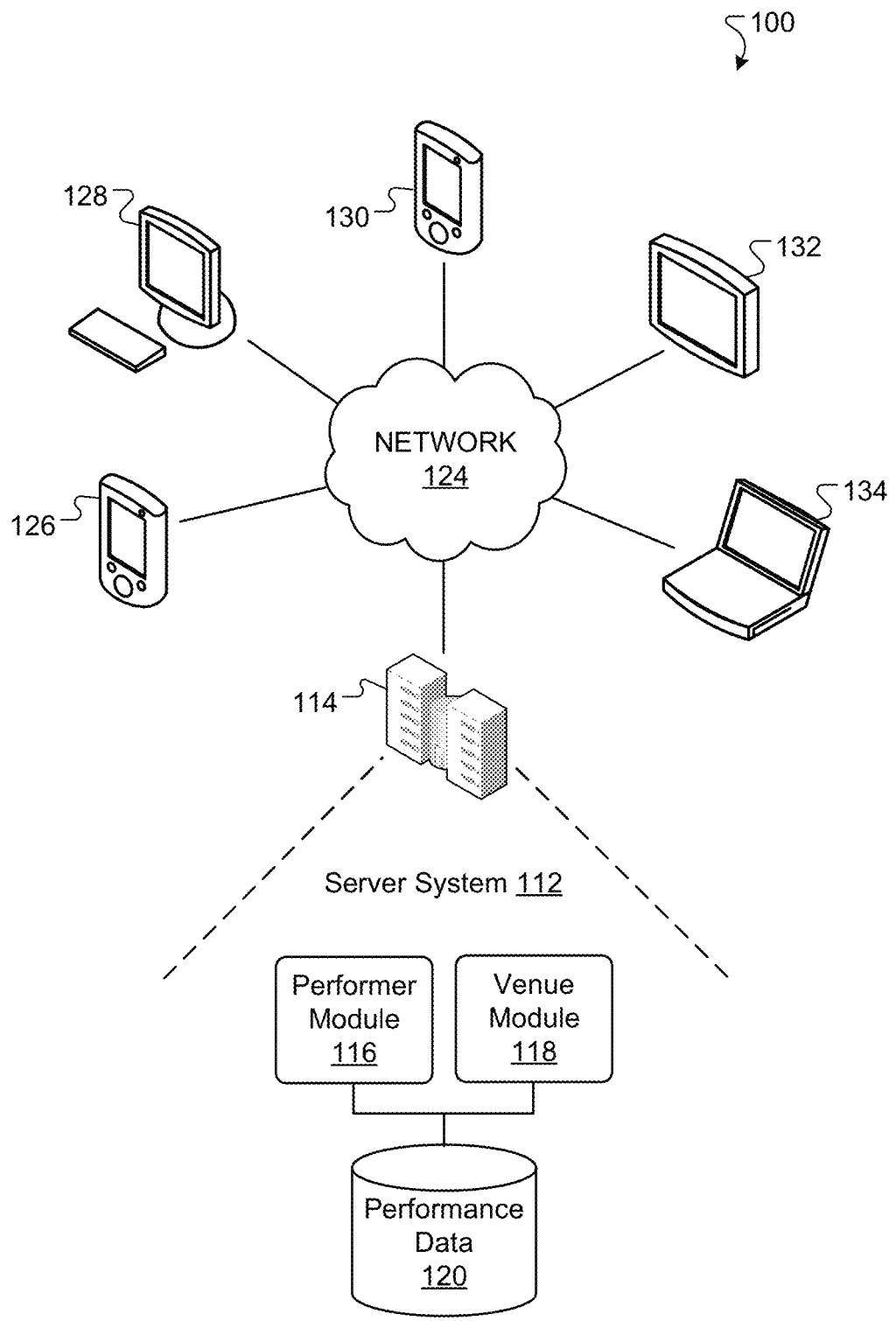
FIG. 1 is a schematic diagram of a system for determining schedules for live events, in accordance with certain examples.

FIG. 1 illustrates an example system 100 for scheduling live events, such as a series of performances (e.g., concerts) by a performer (e.g., a musician or band) in different geographic regions (e.g., different cities, states, or countries). A server system 112 provides functionality for determining schedules for the live events based on a variety of inputs, as described herein. The server system 112 includes software components and databases that can be deployed at one or more data centers 114 in one or more geographic locations, for example. The server system 112 software components can include, for example, a performer module 116 and a venue module 118. The server system 112 can include subcomponents that can execute on the same or on different individual data processing apparatus. The server system 112 databases can include a performance data 120 database, though it is understood that any number of databases can be included. The databases can reside in one or more physical storage systems. The software components and data will be further described below.

An application, such as, for example, a web-based or other software application can be provided as an end-user application to allow users to interact with the server system 112. The software application or components thereof can be accessed through a network 124 (e.g., the Internet) by users of client devices, such as a smart phone 126, a personal computer 128, a smart phone 130, a tablet computer 132, and a laptop computer 134. Other client devices are possible.

The performer module 116 can include software components that support the software application by, for example, determining a desired or optimal schedule for a series of live events for a performer. For example, the performer module 116 can receive input parameters for a proposed series of live events for the performer and, based on the parameters, determine the desired or optimal schedule for the live events (e.g., using a machine learning model). The performer module 116 can update the schedule based on a change to the input parameters. For example, a performer or an agent or representative of the performer can use the software application to access the performer module 116 and determine a desired or optimal schedule for the performer's live events.

Similarly, the venue module 118 can include software components that support the software application by, for example, determining a desired or optimal schedule for a plurality of live events involving a plurality of performers at one or more venues. For example, the venue module 118 can receive input parameters for proposed performances at a venue and, based on the parameters, determine the desired or optimal schedule for the live events at the venue (e.g., using a machine learning model). The venue module 118 can update the schedule based on a change to the input parameters. For example, a manager or owner of one or more venues can use the software application to access the venue module 118 and determine a desired or optimal schedule for the one or more venues (e.g., over a specified date range).

The performance data 120 database can store and provide data for the software application and/or can provide data to or receive data from the performance model 116 and the venue module 118. The data can include, for example, information related to performers, venues, and associated live events. For example, the data can include information related to performance dates (e.g., proposed dates for a concert tour), performer availability (e.g., dates when an artist is available or not already booked), venue availability (e.g., dates when a venue is available or not already booked), financial data (e.g., ticket prices, artist fees, venue fees, etc.), demographics (e.g., demographic data for ticket holders or other consumers), travel data (e.g., travel expenses and/or distances traveled by a performer for a proposed series of live events), social media data (e.g., data related to performer popularity), or any combination thereof.

Figure 2:
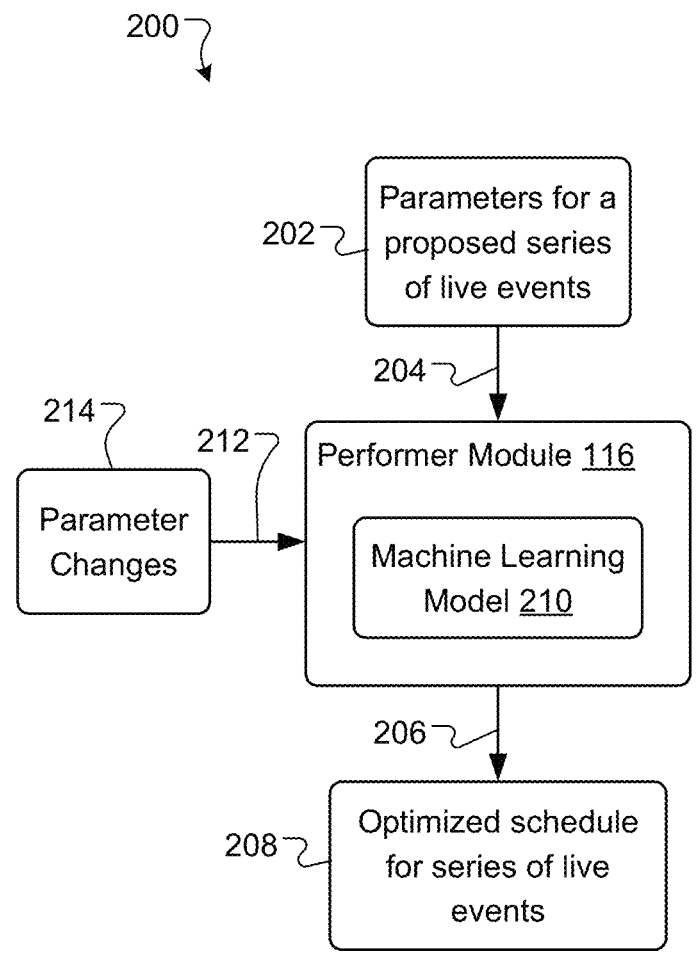
FIG. 2 is a block diagram of a method of generating a schedule for a series of live events involving a single performer, in accordance with certain examples.

FIG. 2 depicts an example method 200 in which the performer module 116 is used to schedule a series of live events for a performer. Parameters 202 for a proposed series of live events are provided (step 204) as inputs to the performer module 116. Such input parameters 202 can be, include, or relate to, for example: a proposed or tentative schedule for the series of live events, a proposed range of dates for the live events, a proposed set of locations for the live events (e.g., including cities, states, and/or countries), venue availability (e.g., dates and/or times when one or more venues are available to host one or more of the live events in the proposed locations), venue locations (e.g., an address for each venue), proposed ticket prices (e.g., for each available venue or available seat in each venue), cost information (e.g., venue fees, travel expenses, etc.), scheduled performances by the same performer or other performers (e.g., a competing band in the same geographic region), weather data (e.g., average temperatures for a venue at a proposed time), or any combination thereof. The input parameters 202 can be retrieved from the performance data 120 database, can be manually entered by users, and/or can be retrieved from other sources (e.g., a database or website operated by a third party, such as a venue manager). In some instances, for example, a user may specify the dates when the performer is available to perform.

In the depicted example, the performer module 116 uses the input parameters 202 to determine and output (step 206) a desired or optimal schedule 208 for the series of live events 206. The schedule 208 can be or include, for example, a schedule for the series of live events that optimizes, maximizes, or minimizes one or more target features for the live events. Such target features can include, for example, attendance at one or more of the live events (e.g., a total attendance or attendance by a particular demographic), a profit for one or more of the live events, a revenue for one or more of the live events, and/or costs or expenses for one or more of the live events. A user of the software application can specify the target features that should be considered by the performer module 116. Additionally or alternatively, each target feature can be assigned a weight that indicates an importance of the target feature. For example, a user may choose to weigh attendance for a particular demographic segment more heavily than total attendance or revenue. Such weights can allow the performer module 116 to determine the schedule 208 based on particular combinations of target features that may be of interest.

In some embodiments, the performer module 116 includes or utilizes a machine learning model 210 or other predictive tool for determining the desired or optimal schedule 208. In general, any suitable machine learning technique can be used, such as, for example: a gradient boosted random forest, a regression, a neural network, a decision tree, a support vector machine, a Bayesian network, other type of technique. The machine learning model 210 can be trained using a set of training data. The training data can be or include, for example, historical data from previous live events or series of live events. Such data can include information related to the input parameters 202 (e.g., dates, venue locations, ticket prices, social media data, etc.) and the target features (e.g., attendance, revenue, expenses, etc.). In general, the machine learning model 210 can be trained to recognize how to optimize, maximize, or minimize one or more of the target features based on a given set of input parameters. Once trained, the machine learning model 210 can receive the input parameters 202 as input, generate the optimized schedule, and provide the schedule 208 as output. To generate the schedule, the performer module 116 and/or the machine learning model 210 can choose a venue, a date, and/or a time for the live events (e.g., for each live event) in the series of live events.

In some examples, after the schedule 208 has been determined, the performer module 116 can receive (step 212) one or more updates or changes 214 to the input parameters. These parameter changes 214 can include, for instance, changes to venue availability, ticket prices, expenses, performer availability, weather conditions, other input parameters, or any combination thereof. The performer module 116 can then update the schedule 208 in response to the parameter changes 214. For example, if a higher capacity venue becomes available, the schedule 208 can be updated to replace a lower capacity venue with the higher capacity venue. Such a change could result in a new schedule 208 that is preferred over an original or previous schedule 208. For example, the new schedule 208 may achieve a better optimization of one or more of the target features (e.g., revenue, attendance, expenses, travel times, etc.). In some embodiments, the performer module 116 can search for and/or receive the parameter changes 214 on a regular schedule or at periodic intervals (e.g., every hour, day, week, or month). Alternatively or additionally, the performer module 116 can receive parameter changes 214 when prompted to do so by a user. For instance, the user can use a client device to instruct the performer module 116 to retrieve the parameter changes 214 and/or can enter the parameter changes 214 manually. In some examples, the schedule 208 can be updated based on real-time data (e.g., real-time parameter changes 214) and, in some instances, the schedule 208 can be dynamically updated in response to changes in this data.

Figure 3:
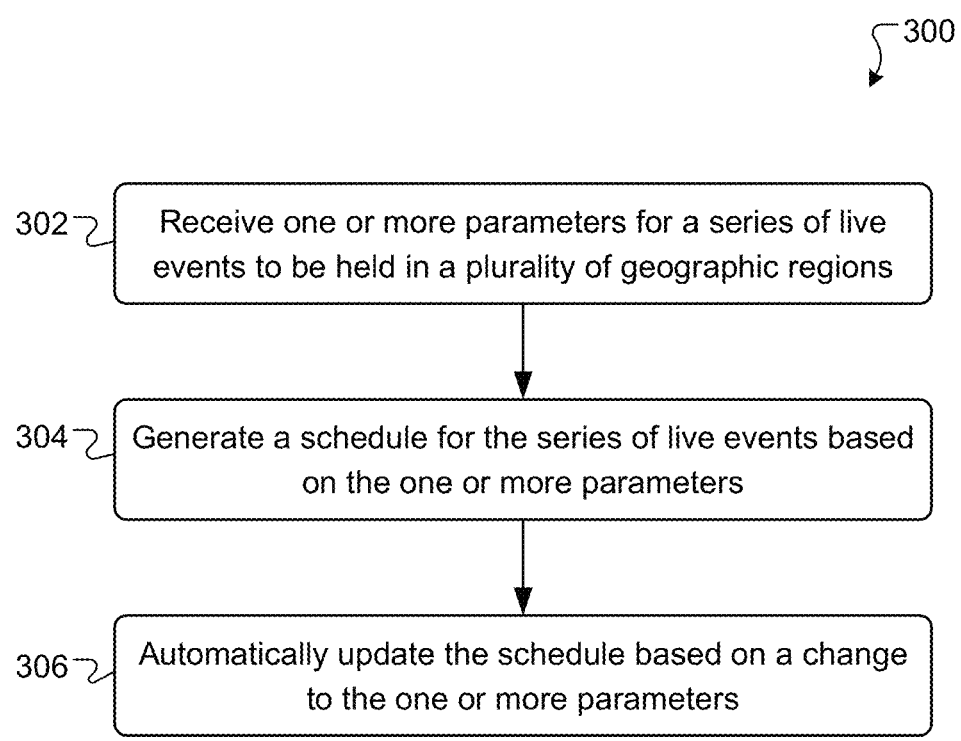
FIG. 3 is a flowchart of a method of generating a schedule for a series of live events involving a single performer, in accordance with certain examples.

FIG. 3 is a flowchart of a computer-implemented method 300 of dynamically generating an event schedule, in accordance with certain embodiments. One or more parameters for a series of live events to be held in a plurality of geographic locations are received (step 302). A schedule for the series of live events is generated (step 304) based on the one or more parameters. The schedule is automatically updated (step 306) based on a change to the one or more parameters.

Figure 4:
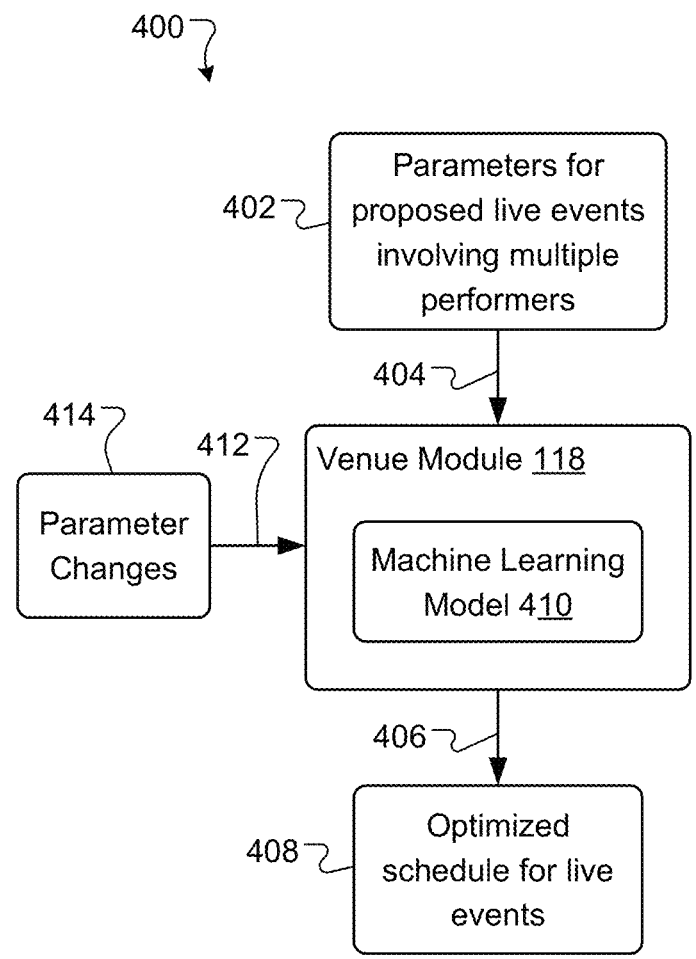
FIG. 4 is a block diagram of a method of generating a schedule for live events involving multiple performers, in accordance with certain examples.

FIG. 4 depicts an example method 400 in which the venue module 118 is used to schedule live events for a plurality of performers at one or more venues. Parameters 402 for proposed live events involving the plurality of performers are provided (step 404) as inputs to the venue module 118. Such input parameters 402 can be, include, or relate to, for example: a proposed or tentative schedule for the live events at the one or more venues, a proposed range of dates for the live events, a proposed set of locations for the live events (e.g., including cities, states, and/or countries), venue availability (e.g., dates and/or times when one or more venues are available to host one or more of the live events in the proposed locations), venue locations (e.g., an address for each venue), proposed ticket prices (e.g., for each available venue or available seat in each venue), cost information (e.g., artist fees, vendor fees, etc.), scheduled performances by the same performer or other performers (e.g., a competing band in the same geographic region), weather data (e.g., average temperatures for a venue at a proposed time), or any combination thereof. The input parameters 402 can be retrieved from the performance data 120 database, can be manually entered by users, and/or can be retrieved from other sources (e.g., a database or website operated by a third party, such as a manager of a venue or performer). In some embodiments, for example, a user may specify a set of available performers, a set of available venues, and/or a range of dates for one or more performances.

In the depicted example, the venue module 118 can use the input parameters 402 to determine and output (step 406) a desired or optimized schedule 408 for the live events involving multiple performers at one or more venues. The schedule 408 can cover, for example, a plurality of performers and a plurality of venues (e.g., in different cities, states, countries, or other geographic regions) for a period of time that can range from a day to multiple weeks, months, or years. In some examples, the schedule 408 can be or include a schedule of live events for a plurality of venues owned or managed by a single user or entity. Alternatively or additionally, the schedule 408 can be a schedule for a plurality of performers who are managed by a single user or entity. Many other types of schedules 408 are possible. In some embodiments, multiple events on the schedule 408 can be scheduled to occur concurrently (e.g., two performers performing at the same time in different venues).

In various examples, the schedule 408 can be or include, for example, a schedule for the live events (by multiple performers at one or more venues) that optimizes, maximizes, or minimizes one or more target features for the live events. Such target features can include, for example, attendance at one or more of the live events (e.g., a total attendance or attendance by a particular demographic), a profit for one or more of the live events, a revenue for one or more of the live events, and/or costs or expenses for one or more of the live events. A user of the software application can specify the target features that should be considered by the venue module 118. Additionally or alternatively, each target feature can be assigned a weight that indicates an importance of the target feature. For example, a user may choose to weigh attendance for a particular demographic segment more heavily than total attendance or revenue. Such weights can allow the performer module 118 to determine the schedule 408 based on particular combinations of target features that may be of interest.

In various implementations, the venue module 118 includes or utilizes a machine learning model 410 or other predictive tool for determining the desired or optimal schedule 408. In general, any suitable machine learning technique can be used, such as, for example: a gradient boosted random forest, a regression, a neural network, a decision tree, a support vector machine, a Bayesian network, other type of technique. The machine learning model 410 can be trained using a set of training data. The training data can be or include, for example, historical data from previous live events or series of live events. Such data can include information related to the input parameters 402 (e.g., dates, venue locations, ticket prices, social media data, etc.) and the target features (e.g., attendance, revenue, expenses, etc.). In general, the machine learning model 410 can be trained to recognize how to optimize, maximize, or minimize one or more of the target features based on a given set of input parameters. Once trained, the machine learning model 410 can receive the input parameters 402 as input, generate the optimized schedule, and provide the schedule 408 as output. To generate the schedule, the venue module 118 and/or the machine learning model 410 can choose a performer, a venue, a date, and/or a time for the live events (e.g., for each live event).

In some examples, after the schedule 408 has been determined, the venue module 118 can receive (step 412) one or more updates or changes 414 to the input parameters. These parameter changes 414 can include, for instance, changes to venue availability, ticket prices, expenses, performer availability, weather conditions, other input parameters, or any combination thereof. The venue module 118 can then update the schedule 408 in response to the parameter changes 414. For example, if a performer becomes unavailable, the venue module 118 can update the schedule 408 to include a substitute performer. Such a change could result in a new schedule 408 that is preferred over an original or previous schedule 408. For example, the new schedule 408 may achieve a better optimization of one or more of the target features (e.g., revenue, attendance, expenses, travel times, etc.). In some embodiments, the venue module 118 can search for and/or receive the parameter changes 414 on a regular schedule or at periodic intervals (e.g., every hour, day, week, or month). Alternatively or additionally, the venue module 118 can receive parameter changes 414 when prompted to do so by a user. For instance, the user can use a client device to instruct the venue module 118 to retrieve the parameter changes 414 and/or can enter the parameter changes 414 manually. In some examples, the schedule 408 can be updated based on real-time data (e.g., real-time parameter changes 414) and, in some instances, the schedule 408 can be dynamically updated in response to changes in this data.

Figure 5:
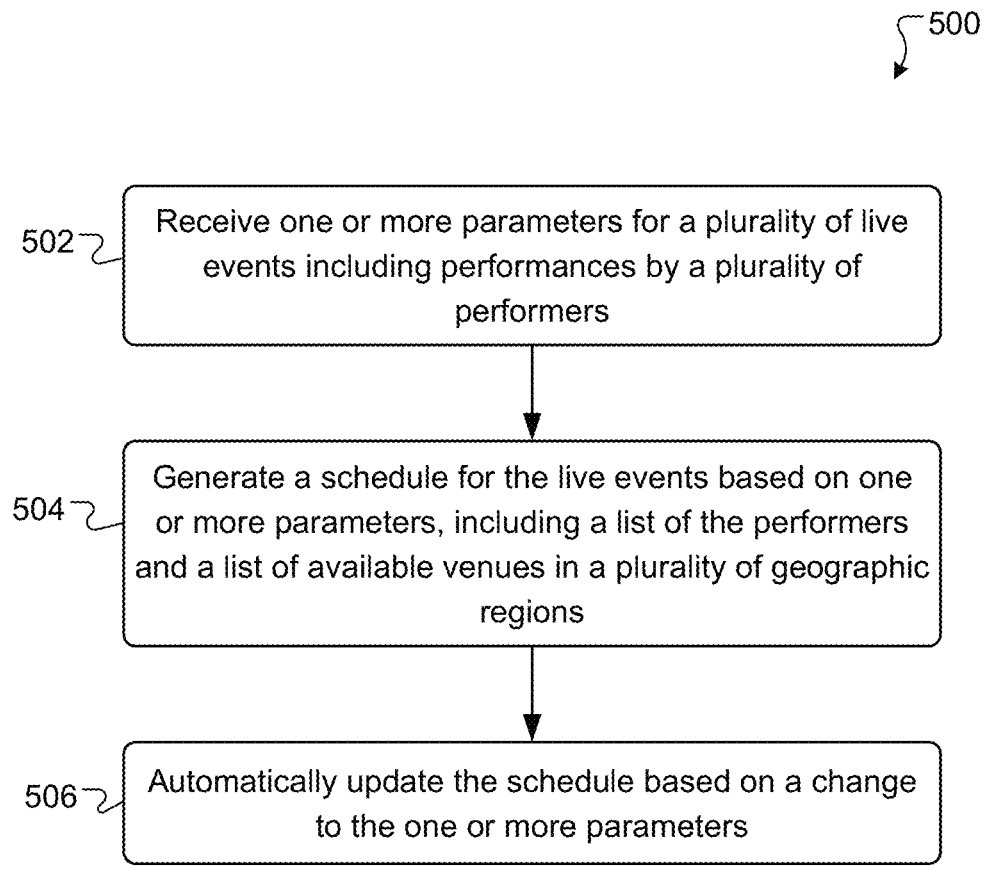
FIG. 5 is a flowchart of a method of generating a schedule for live events involving multiple performers, in accordance with certain examples.

FIG. 5 is a flowchart of a computer-implemented method 500 of dynamically generating an event schedule, in accordance with certain examples. One or more parameters for a plurality of live events are received (step 502). The live events can be or include performances by a plurality of performers, and the one or more parameters can include a list of the performers and a list of available venues in a plurality of geographic regions. A schedule for the live events is generated (step 504) based on the one or more parameters. The schedule is automatically updated (step 506) based on a change to the one or more parameters.

Advantageously, the systems and methods disclosed herein can allow performers, venue owners, promoters, and other individuals or entities to create optimized schedules for live events, including a series of live events by a single performer (e.g., a concert tour) or a collection of live events by multiple performers at one or more venues. The schedules can be optimized for profit, revenue, expenses, travel, attendance, other target features, or any combination thereof (e.g., based on weights assigned to the target features). In some embodiments, input parameters for the performer module 116 and/or the venue module 118 (e.g., the input parameters 202 and/or 402) can be or include social media activity data. Such data can be mined or analyzed to determine how popular a performer may be. For example, the performer module 116 and/or the venue module 118 can use such data to determine performer popularity or demand in one or more geographic regions. This can allow the performer module 116 and/or the venue module 118 to make more accurate predictions for ticket sales, attendance, and/or appropriate ticket prices. Such predictions can be made or used by the performer module 116 and/or the venue module 118 when generating the optimized schedules 208 and/or 408.

Advantageously, the systems and methods described herein represent and/or achieve a significant improvement in computer functionality. For example, use of the performer module 116 and the venue module 118 (and the associated machine learning models 210 and 410) can improve the accuracy and/or automation of data processing. In various instances, for example, the performer module 116 and venue module 118 are developed and trained to receive a wide variety and quantity of data (e.g., the input parameters) and to consider a variety of target features when generating desired or optimized schedules for live events. Such schedules can be updated, as needed, when any changes to the input parameters or target features are received. By training the performer module 116 and the venue module 118 to generate optimized schedules automatically and update the schedules dynamically, in response to real-time changes in data, the input parameters and target features can be processed and considered more efficiently and accurately, compared to prior approaches.

Figure 6:
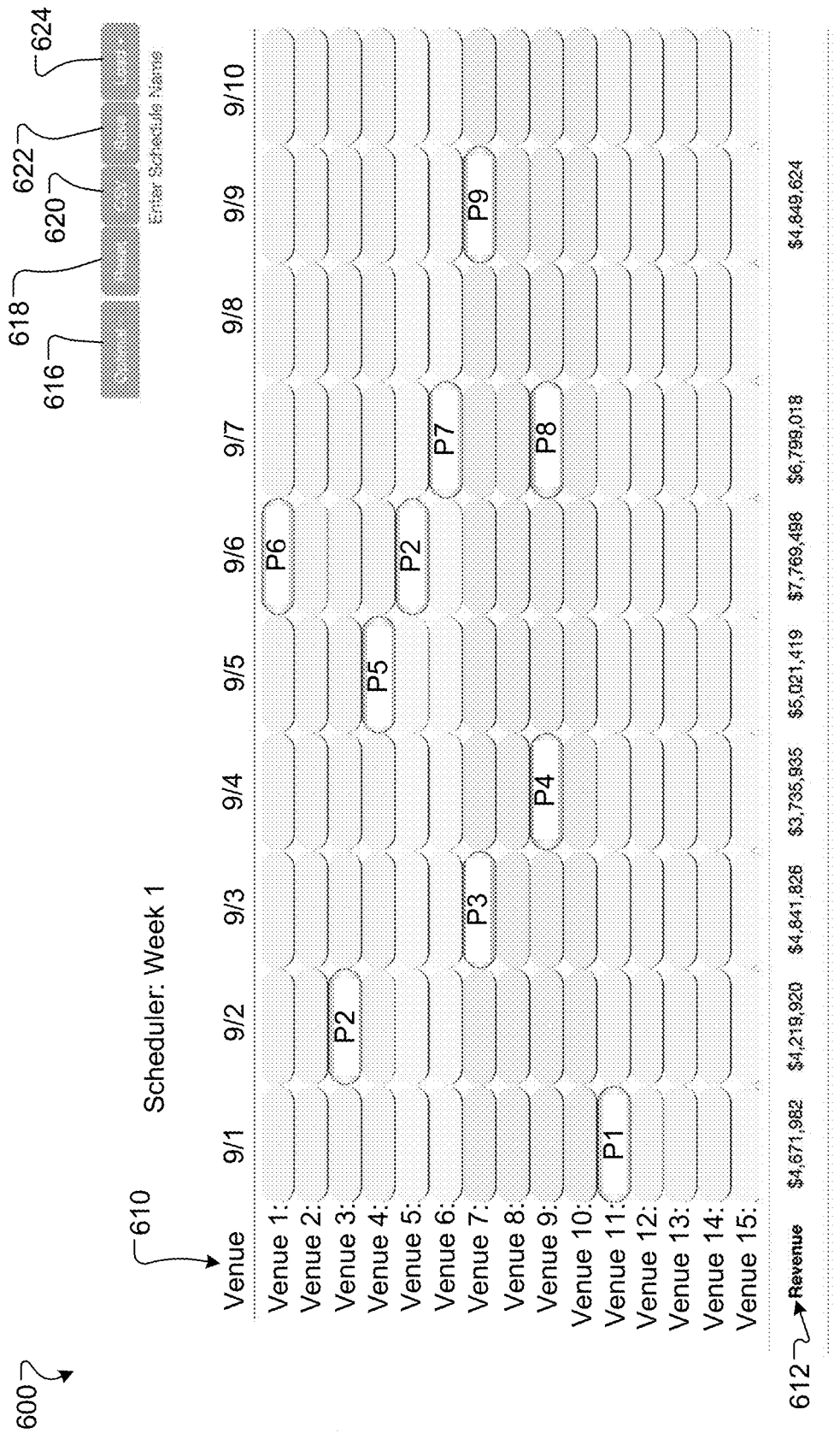
FIG. 6 is a schematic diagram of a graphical user interface presenting a schedule of live events involving multiple performers and multiple venues, in accordance with certain examples.

FIG. 6 depicts an example of an optimized schedule 600 (e.g., created using the venue module 118) for a plurality of venues 610 (labeled Venues 1 through 15) and a plurality of performers (labeled P1 through P9) over a range of dates (e.g., September 1st through September 10th). The schedule 600 in this example is presented as a table, with a first column listing the venues 610 and each remaining column representing a date from the range of dates (e.g., consecutive dates over a time period or a subset of dates, such as weekend dates, for the time period). Each row in the table represents a different venue from the plurality of venues 610. In the depicted example, the schedule 600 identifies the dates when the performers are scheduled to perform and the venues where the performances are scheduled to occur. For example, performer P1 is scheduled to perform on 9/1 at Venue 11, and performer P2 is scheduled to perform on 9/2 at Venue 3. Some performers can appear multiple times in the schedule 600. For example, performer P2 is also scheduled to perform on 9/6 at Venue 5. The list of venues 610 can include a listing of available venues for the performers during the date range. Some of the venues 610 in this example (e.g., Venue 2) are not selected to host any performances in the schedule 600. The venues 610 can be located in different geographic regions (e.g., cities, states, or countries) or in the same geographic region.

In some embodiments, the schedule 600 may list one or more target features that were optimized or calculated by the venue module 118 when generating the schedule 600. In the depicted example, a revenue target feature 612 is presented for several of the columns (e.g., columns associated with at least one performance), and a total revenue target feature 614 is presented for the entire schedule 600 (e.g., for all dates and scheduled performances). Other target features, such as cost, attendance, and/or demographics for attendees can be presented in the schedule 600 in addition to or instead of the revenue target feature 612 and/or the total revenue target feature 614.

In certain examples, a graphical user interface for the schedule 600 can include various user interface buttons, such as, for example, an optimal button 616, a reset button 618, a CSV button 620, a save button 622, and/or a load button 624. By selecting the reset button 618, for example, the user can clear the schedule 600 of all or almost all of its values or information. By selecting the save button 622, the user can save a copy of the current schedule 600 (e.g., to a user client device or to a server computer). The load button 624 can be selected to import a schedule that was previously generated or saved. The CSV button 620 can be used to create a CSV file or a spreadsheet file that includes data from the schedule 600. Alternatively, in some examples, the CSV button 620 can be used to load a CSV file or a spreadsheet file to create or present the schedule 600 or a different schedule.

FIG. 7 depicts an example of an optimized schedule 700 (e.g., created using the performer module 116) for a series of live events involving a single performer (labeled P1) and a plurality of venues 710 (labeled Venues 1 through 8) over a range of dates (e.g., September 1st through September 9th). The schedule 700 in this example is presented as a table, with a first column listing the venues 710 and each remaining column representing a date from the range of dates (e.g., consecutive dates over a time period or a subset of dates, such as weekend dates, for the time period). Each row in the table represents a different venue from the plurality of venues 710. In the depicted example, the schedule 700 identifies the dates and venues for each scheduled performance by the performer P1. For example, the performer P1 is scheduled to perform on 9/1 at Venue 1 and on 9/2 at Venue 4. Some dates (e.g., 9/4 and 9/7) do not have any performances scheduled for the performer P1. Also, while the depicted example indicates the performer P1 is performing in no more than one venue on any given date, it is understood that the performer could be scheduled to perform in multiple venues on the same date, if scheduling permits. The list of venues 710 can include a listing of available venues for the performer during the date range. One of the venues 710 in this example (e.g., Venue 6) is not selected to host any performances in the schedule 700.

In certain embodiments, the schedule 700 may list one or more target features that were optimized or calculated by the venue module 118 when generating the schedule 700. For example, one or more target features (e.g., revenue, cost, and/or attendance) can be presented for one or more dates in or near a bottom row 712 of the schedule 700. Additionally or alternatively, a total target feature 714 (e.g., total revenue, cost, and/or total attendance) can be presented for the entire schedule 700 (e.g., all dates and scheduled performances). A graphical user interface for the schedule 700 can include one or more buttons (not shown) that allow a user to reset the schedule 700, generate a CSV or spreadsheet file with the schedule information, save the schedule, or load a different schedule.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto-optical disks, optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse, a trackball, a touchpad, or a stylus, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation.

Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Each numerical value presented herein, for example, in a table, a chart, or a graph, is contemplated to represent a minimum value or a maximum value in a range for a corresponding parameter. Accordingly, when added to the claims, the numerical value provides express support for claiming the range, which may lie above or below the numerical value, in accordance with the teachings herein. Absent inclusion in the claims, each numerical value presented herein is not to be considered limiting in any regard.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. The features and functions of the various embodiments may be arranged in various combinations and permutations, and all are considered to be within the scope of the disclosed invention. Accordingly, the described embodiments are to be considered in all respects as only illustrative and not restrictive. Furthermore, the configurations, materials, and dimensions described herein are intended as illustrative and in no way limiting. Similarly, although physical explanations have been provided for explanatory purposes, there is no intent to be bound by any particular theory or mechanism, or to limit the claims in accordance therewith.

What is claimed is:

1. A computer-implemented method of dynamically generating an event schedule, the method comprising:
    receiving one or more event parameters for series of live events, wherein the one or more event parameters comprise at least one of venue availability, venue locations, proposed ticket prices, performer fees, venue fees, scheduled performances by one or more performers, or any combination thereof;
    receiving one or more event target features associated with the series of live events, wherein the one or more event target features comprise at least one of event attendance, event profit, event revenue, event expenses, or any combination thereof;
    providing the one or more event parameters and the one or more event target features to a machine learning (ML) model, wherein the ML model is at least one of a neural network ML model and a support vector ML model;
    iteratively training the ML model to identify relationships between different event parameters and the one or more event target features using historical data corresponding to one or more previous series of live events, wherein such iterative training improves the accuracy of the ML model;
    receiving, from a user, one or more user-specific event parameters for a future series of live events to be held in a plurality of geographic regions;
    receiving, from the user, one or more user-specific event weights representing one or more prioritized event target features associated with the future series of live events;
    providing the one or more user-specific event parameters and the one or more user-specific event weights to the trained ML model;
    generating, via the trained ML model, a schedule for the future series of live events that is optimized relative to the one or more prioritized event target features;
    detecting a real-time change to the one or more user-specific event parameters;
    providing the real-time change to the trained ML model to improve the accuracy of the trained ML model; and
    updating, via the trained ML model, the schedule for the future series of live events such that the schedule remains optimized relative to the one or more prioritized event target features in view of the real-time change to the one or more user-specific event parameters.

2. The method of claim 1, wherein the one or more user-specific event parameters comprise a tentative schedule for the future series of live events.

3. The method of claim 1, wherein the future series of live events comprises a tour for at least one of a band, a music group, an author, a performer, a comedian, a politician, an activist, or a speaker.

4. The method of claim 1, wherein generating the schedule for the future series of live events that is optimized relative to the one or more prioritized target features comprises generating a schedule that maximizes at least one of a revenue or a total attendance for at least one of the future series of live events or a single event from the future series of live events.

5. The method of claim 1, wherein generating the schedule for the future series of live events that is optimized relative to the one or more prioritized target features comprises generating a schedule that maximizes at least one of a revenue or a total attendance at the future series of live events for a particular demographic segment.

6. The method of claim 1, wherein generating the schedule for the future series of live events that is optimized relative to the one or more prioritized target features comprises choosing at least one of a venue, a date, or a time for each live event in the future series of live events.

7. The method of claim 1, wherein the geographic regions comprise at least one of a country, a state, or a city.

8. The method of claim 1, wherein detecting the real-time change to the one or more user-specific event parameters includes collecting and/or analyzing social media data related to the future series of live events.

9. A system comprising:
one or more computer systems programmed to perform operations comprising:
receiving one or more event parameters for series of live events, wherein the one or more event parameters comprise at least one of venue availability, venue locations, proposed ticket prices, performer fees, venue fees, scheduled performances by one or more performers, or any combination thereof;
receiving one or more event target features associated with the series of live events, wherein the one or more event target features comprise at least one of event attendance, event profit, event revenue, event expenses, or any combination thereof;
providing the one or more event parameters and the one or more event target features to a machine learning (ML) model, wherein the ML model is at least one of a neural network ML model and a support vector ML model;
iteratively training the ML model to identify relationships between different event parameters and the one or more event target features using historical data corresponding to one or more previous series of live events, wherein such iterative training improves the accuracy of the ML model;
receiving, from a user, one or more user-specific event parameters for a future series of live events to be held in a plurality of geographic regions;
receiving, from the user, one or more user-specific event weights representing one or more prioritized event target features associated with the future series of live events;
providing the one or more user-specific event parameters and the one or more user-specific event weights to the trained ML model;
generating, via the trained ML model, a schedule for the future series of live events that is optimized relative to the one or more prioritized event target features;
detecting a real-time change to the one or more user-specific event parameters;
providing the real-time change to the trained ML model;
providing the real-time change to the trained ML model to improve the accuracy of the trained ML model; and
updating, via the trained ML model, the schedule for the future series of live events such that the schedule remains optimized relative to the one or more prioritized event target features in view of the real-time change to the one or more user-specific event parameters.

10. The system of claim 9, wherein detecting the real-time change to the one or more user-specific event parameters includes collecting and/or analyzing social media data related to the future series of live events.

11. A computer-implemented method of dynamically generating an event schedule, the method comprising:
receiving one or more event parameters for live events comprising performances by a plurality of performers, wherein the one or more event parameters comprise at least one of a list of the performers, a list of available venues in a plurality of geographic regions, proposed ticket prices, performer fees, venue fees, scheduled performances by one or more performers, or any combination thereof;
receiving one or more event target features associated with live events, wherein the one or more event target features comprise at least one of event attendance, event profit, event revenue, event expenses, or any combination thereof;
providing the one or more event parameters and the one or more event target features to a machine learning (ML) model, wherein the ML model is at least one of a neural network ML model and a support vector ML model;
iteratively training the ML model to identify relationships between different event parameters and the one or more event target features using historical data corresponding to a plurality of previous live events, wherein such iterative training improves the accuracy of the ML model apply;
receiving, from a user, one or more user-specific event parameters for a plurality of future live events to be held in a plurality of geographic regions;
receiving, from the user, one or more user-specific event weights representing one or more prioritized event target features associated with the plurality of future live events;
providing the one or more user-specific event parameters and the one or more user-specific event weights to the trained ML model;
generating, via the trained ML model, a schedule for the plurality of future live events that is optimized relative to the one or more prioritized event target features;
detecting a real-time change to the one or more user-specific event parameters;
providing the real-time change to the trained ML model to improve the accuracy of the trained ML model; and
updating, via the trained ML model, the schedule for the plurality of future live events such that the schedule remains optimized relative to the one or more prioritized event target features in view of the real-time change to the one or more user-specific event parameters.

12. The method of claim 11, wherein generating the schedule for the plurality of future live events that is optimized relative to the one or more prioritized target features comprises generating a schedule that maximizes a total attendance for at least one of the plurality of future live events or a single event from the plurality of future live events.

13. The method of claim 11, wherein generating the schedule for the plurality of future live events that is optimized relative to the one or more prioritized target features comprises generating a schedule that maximizes a total attendance at the plurality of future live events for a particular demographic segment.

14. The method of claim 11, wherein the one or more user-specific event parameters comprise at least one date for the plurality of future live events.

15. The method of claim 11, wherein the plurality of performers comprises at least one of a band, a music group, an author, a comedian, a politician, an activist, or a speaker.

16. The method of claim 11, wherein generating the schedule for the plurality of future live events that is optimized relative to the one or more prioritized target features comprises assigning (i) a first performer from the list of performers to a first venue from the list of available venues and (ii) a second performer from the list of performers to a second venue from the list of available venues.

17. The method of claim 11, wherein the geographic regions comprise at least one of a country, a state, or a city.

18. The method of claim 11, wherein detecting the real-time change to the one or more user-specific event parameters includes collecting and/or analyzing social media data related to the plurality of future live events.

19. A system comprising:
one or more computer systems programmed to perform operations comprising:
receiving one or more event parameters for live events comprising performances by a plurality of performers, wherein the one or more event parameters comprise at least one of a list of the performers, a list of available venues in a plurality of geographic regions, proposed ticket prices, performer fees, venue fees, scheduled performances by one or more performers, or any combination thereof;
receiving one or more event target features associated with live events, wherein the one or more event target features comprise at least one of event attendance, event profit, event revenue, event expenses, or any combination thereof;
providing the one or more event parameters and the one or more event target features to a machine learning (ML) model, wherein the ML model is at least one of a neural network ML model and a support vector ML model;
iteratively training, in a second stage, the ML model to identify relationships between different event parameters and the one or more event target features using historical data corresponding to a plurality of previous live events, wherein such iterative training improves the accuracy of the ML model;
receiving, from a user, one or more user-specific event parameters for a plurality of future live events to be held in a plurality of geographic regions;
receiving, from the user, one or more user-specific event weights representing one or more prioritized event target features associated with the plurality of future live events;
providing the one or more user-specific event parameters and the one or more user-specific event weights to the trained ML model;
generating, via the trained ML model, a schedule for the plurality of future live events that is optimized relative to the one or more prioritized event target features;
detecting a real-time change to the one or more user-specific event parameters;
providing the real-time change to the trained ML model to improve the accuracy of the trained ML model; and
updating, via the trained ML model, the schedule for the plurality of future live events such that the schedule remains optimized relative to the one or more prioritized event target features in view of the real-time change to the one or more user-specific event parameters.

20. The system of claim 19, wherein detecting the real-time change to the one or more user-specific event parameters includes collecting and/or analyzing social media data related to the plurality of future live events.

* * * * *